United States Patent [19]

DeStefanis

[11] Patent Number: 5,318,785
[45] Date of Patent: Jun. 7, 1994

[54] BENZOYL PEROXIDE TO IMPROVE THE PERFORMANCE OF OXIDANTS IN BREADMAKING

[75] Inventor: Vincent DeStefanis, Erie, N.Y.

[73] Assignee: Elf Atochem North America, Inc., Philadelphia, Pa.

[21] Appl. No.: 14,958

[22] Filed: Feb. 8, 1993

Related U.S. Application Data

[63] Continuation-in-part of Ser. No. 798,373, Nov. 26, 1991, abandoned.

[51] Int. Cl.$^5$ .......................... A21D 2/04; A21D 2/20
[52] U.S. Cl. ...................................... 426/20; 426/22; 426/62; 426/653
[58] Field of Search ............... 426/22, 20, 653, 62

[56] References Cited

U.S. PATENT DOCUMENTS

| | | | |
|---|---|---|---|
| 2,978,331 | 4/1961 | Ferrari | 426/99 |
| 2,978,332 | 4/1961 | Ferrari | 426/99 |
| 2,992,111 | 7/1961 | Ferrari | 426/96 |
| 3,640,730 | 2/1972 | Rolland | 426/91 |
| 3,954,999 | 4/1976 | Vidal | 426/61 |
| 4,657,769 | 4/1987 | Petrofsky et al. | 426/653 X |

*Primary Examiner*—Joseph Golian
*Attorney, Agent, or Firm*—Stanley A. Marcus; Royal E. Bright

[57] ABSTRACT

An improvement in dough compositions comprising the replacement of bromate improvers in conventional doughs with compositions comprising ascorbic acid, azodicarbonamide, and mixtures thereof in combination with peroxy compounds such as benzoyl peroxide and hydrogen peroxide in the presence or absence of fungal enzymes such as fungal alpha amylase and processes for their use are disclosed.

13 Claims, No Drawings

BENZOYL PEROXIDE TO IMPROVE THE PERFORMANCE OF OXIDANTS IN BREADMAKING

CROSS REFERENCE TO PRIOR APPLICATIONS

This application is a continuation-in-part of application Ser. No. 07/798,373 filed Nov. 26, 1991 now abandoned.

BACKGROUND OF THE INVENTION

This invention relates principally to the art of the chemistry of bread making, particularly to novel compositions as improvers of the properties of dough for bread making, more particularly to novel compositions containing oxidant improvers of the properties of dough and the breads prepared therefrom, still more particularly to novel oxidant containing compositions capable of replacing bromates in dough and bread improvement and to processes for their preparation and use.

CITATION OF ART

U.S. Pat. No. 3,954,999 to Vidal et al describes a method of explosion proofing and fireproofing, using selected hydrated inorganic salts, of mixtures of strong inorganic oxidizers, including bromates, and calcium peroxide, with various organic materials such as azodicarbonamide and other amides, amino acids, enzymes, organic peroxides and ascorbic acid. Nothing teaches or suggests that selection of a particular combination of the organic ingredients listed will provide a substitute for the bromate or other strong inorganic oxidizers in doughs.

U.S. Pat. No. 3,640,730 to Rolland et al describes treatment of white flour with various conditioning agents including benzoyl peroxide and azodicarbonamide. Even when flour is conditioned with a mixture of those two materials, the benzoyl peroxide decomposes rapidly and is substantially completely gone by the time the flour is incorporated into a dough.

U.S. Pat. Nos. 2,978,331; 2,978,332 and 2,992,111 disclose encapsulation of inorganic phosphates, sulfates and strong inorganic oxidants to prevent their premature reaction with other ingredients during the bread making process. Nothing in these references suggests any reason for the encapsulation of other ingredients in the breadmaking process much less that encapsulation of a particular one to the exclusion of others will permit omission of bromates and other strong oxidizers from conventional bread dough.

Commercial baking of bread requires the use of oxidants ("improvers") at low levels to optimize or improve the complex balance of properties of dough which provide baked bread of high quality. The common improvers are bromate salts, iodate salts, azodicarbonamide and ascorbic acid.

For many years because of their presumed safety at the normal levels of use, their relatively slow action and their tolerance to mixing, bromate salts of calcium and potassium, particularly potassium, have been the improvers of choice. Given the assumed overall satisfactory nature of bromates, there has been no commercial incentive to replace them with any other improvers.

Recently, however, reported animal studies suggest a linkage between bromates and animal cancer. Proposition 65 in California has also placed bromates under close scrutiny as a possible health hazard. It is, therefore, evident that identification of oxidative improvers suitable for use in bread making, capable of approximating the improver action of bromates, particularly potassium bromate is of value.

The amount of oxidant required by the baker depends on the bread making process employed. The most common method, the so called "Sponge and Dough" method, requires only about 15 to 20 parts per million by weight (p.p.m.) of potassium bromate in the dough. Other doughs require up to 75 p.p.m. potassium bromate (the legally permitted maximum concentration) and sometimes even bromate must be supplemented with up to 100 to 200 p.p.m. of other improvers such as L-ascorbic acid (ascorbic acid - "AA") Azodicarbonamide ("ADA") has long been approved as a rapid acting improver for specialized purposes.

In an effort to replace bromate, the baking industry has been experimenting with mixtures of AA and ADA. Neither AA nor ADA at their maximum legal usage levels is able to meet the oxidation level required by certain types of baking, e.g. "No Time", "Frozen Doughs", "Cuban" and the like.

I have found that ADA reacts strongly with AA and reducing substances released by yeast and gluten proteins. By reacting with AA, a reducing agent, and reducing substances from yeast prematurely, the oxidative capacity of ADA is reduced by transformation of the ADA to biurea that is less effective as a dough improver. Therefore, less oxidant (ADA) is available for gluten proteins modification at the dough mixing stage. It is the action of the oxidant on the proteins that results in a dough improving effect, hence, bread of good quality.

One way the bread improving action of ADA may be preserved is by encapsulating the ADA to prevent premature reaction with AA or the reducing substances from yeast. See my copending application Ser. No. 07/738,968 filed Aug. 1, 1991 now abandoned.

This invention provides an alternative means of doing so.

SUMMARY OF THE INVENTION

The invention provides in a first composition aspect a composition comprising a peroxy compound selected from benzoyl peroxide, hydrogen peroxide and mixtures thereof and an oxidant selected from azodicarbonamide (ADA), ascorbic acid (AA), or mixtures thereof.

Special mention is made of compositions wherein the peroxy compound is benzoyl peroxide.

Further mention is made of compositions wherein the oxidant is ADA.

Still further mention is made of compositions wherein the peroxy compound is an aqueous solution of hydrogen peroxide.

Still further mention is made of compositions wherein the ADA is encapsulated in accordance with copending application Ser. No. 07/738,9681 now abandoned (encapsulated ADA).

The encapsulants in said application are selected from the group consisting of wheat protein, wheat flour, corn gluten, hydrocolloid gums, fats and fat derived material having a melting point from about 40° to about 68° C. and mixtures thereof.

Fats and fat derived materials having a melting point from about 40° to about 68° C. are hydrocarbons approved for baking, triglycerides, monoglycerides, sodium and calcium steroyl-2-lactylate, diacetyl tartaric acid esters of mono and diglycerides, polysorbate 60 and mixtures thereof.

Still further mention is made of compositions where the ADA is unencapsulated.

Still further mention is made of compositions wherein the oxidant is AA or mixtures of encapsulated ADA and AA.

The tangible embodiments of this aspect of the invention possess the inherent physical properties, when the peroxy compound is benzoyl peroxide, of being amorphous powdery solids or liquids easily commingled with other ingredients for making a dough or readily blended individually or as a mixture into an already prepared dough. The tangible embodiments when the peroxy compound is hydrogen peroxide are normally liquid compositions and are blended in standard fashion appropriate to such compositions.

The tangible embodiments of this aspect of the invention possess the inherent applied use characteristics of being improvers for bread and bread dough which when employed in the proper proportions in the presence of yeast and AA provide dough which bakes into bread of quality comparable to that obtained from equivalent dough improved with potassium bromate.

The invention provides in a second composition aspect a mixture of food grade fungal enzymes and the first composition aspect of the invention.

Special mention is made of compositions of the second aspect of the invention wherein the fungal enzymes comprise fungal alpha amylase.

The tangible embodiments of this second composition aspect of the invention possess similar inherent physical and applied use properties to those of the first composition of the invention.

The invention also provides in a process aspect a process for preparing a bromate free improved dough having baking properties equivalent to a similar bromate improved dough which comprises blending an improving effective amount of the first composition aspect of the invention into a yeast leavened dough which is substantially free of bromate compounds.

The invention also provides in a process aspect a process for preparing a bromate free improved dough having baking properties equivalent to a similar bromate improved dough which comprises blending an improving effective amount of the second composition aspect of the invention into a yeast leavened dough which is substantially free of bromate compounds.

The invention also provides in a third composition aspect, an improvement in yeast leavened, flour based dough providing bromate free dough having baking properties substantially equivalent to that provided by the use in conventional yeast leavened, flour based dough of bromate improver compositions comprising the substitution for a conventional bromate improver composition, in an otherwise conventional yeast leavened flour based dough, of a peroxy-oxidant improver composition consisting of a peroxy compound selected from the group consisting of benzoyl peroxide, hydrogen peroxide and mixtures thereof, and an oxidant selected from the group consisting of azodicarbonamide and mixtures of azodicarbonamide and ascorbic acid, wherein said azodicarbonamide may be unencapsulated or encapsulated with an encapsulant selected from the group consisting of wheat proteins, wheat flour, corn gluten, hydrocolloid gums, fats and fat derived materials having a melting point from about 400° to about 680° C. and mixtures thereof, and wherein said peroxy-oxidant improver composition is present at a concentration providing at least 20 ppm peroxy compound based on flour weight to said dough.

DETAILED DESCRIPTION

Traditionally, benzoyl peroxide is used for the purpose of bleaching the pigments in flour to achieve a whiter appearance. The addition is made at the flour mill. The peroxide disappears after bleaching within a few hours to 24 hours, depending on the temperature. When benzoyl peroxide is used in this traditional manner, only trace levels or none of it is present during breadmaking. This invention describes a way of deriving an improving action from a peroxy compound (either benzoyl peroxide or hydrogen peroxide) by adding it, as an ingredient, during breadmaking at the bakery.

The compositions of the invention may be prepared by mixing or blending of the ingredients. Blending of the ingredients into a dough either as a mixture of both ingredients of the first composition aspect of the invention, of all three ingredients of the second composition aspect of the invention or by adding one or more of the ingredients separately may be performed by conventional mixing methods.

Once blended into the dough, standard treatment procedures known to one of skill in the art for dough mixing, dough development and baking applicable to the type of dough may be applied to manufacture the finished bread. Bread prepared employing the tangible embodiments of the composition aspects of the invention will have properties including higher specific volume and finer crumb than bread prepared from doughs otherwise containing identical ingredients but lacking the peroxy compound. In addition, the properties, including specific volume and crumb size, of bread prepared from doughs containing tangible embodiments of the invention will approximate those of breads prepared from comparable doughs improved with bromate.

The tangible embodiments of the invention may be added to the dough at any time during its preparation or development but it is preferred for maximum effect that addition take place during the dough mixing stage.

The actual improving effective amount of oxidant, peroxy compound and fungal enzyme may vary widely both for use in a particular type of dough and according to the type of dough into which they are to be incorporated.

Broadly both oxidant and peroxy compound may be incorporated in quantities up to their legal addition limits. Fungal enzymes may be incorporated up to 800 SKB per lb. of flour.

SKB units are a measure of the activity of alpha amylase in the fungal enzymes, the commercially available preparations of which normally contain other enzymes such as protease. The method of determining SKB units is given by Association of American Cereal Chemists, 8th Edition, reprinted 1990, Official method 22-01.

Preferably ADA or encapsulated ADA may be employed in doughs at from about 5 to about 45 ppm. If present, AA is employed in doughs at from about 10 to about 200 ppm. If the peroxy compound is benzoyl peroxide (BPO) it is preferably employed at levels from about 20 to about 200 ppm. Fungal alpha amylase may preferably be employed at levels from 0 to approximately 800 SKB per pound of flour.

Typical concentration ranges for effective amounts of each ingredient in particular types of dough are:

| Type of Baking | ADA* (p.p.m.) | AA (p.p.m.) | BPO** (p.p.m.) | Alpha-Amylase (SKB/lb flour) |
|---|---|---|---|---|
| Sponge-Dough | 5-45 | 0-150 | 20-200 | 0-800 |
| Straight Dough | 5-45 | 0-100 | 20-200 | 0-800 |
| Water Brews | 15-45 | 0-200 | 20-200 | 0-800 |
| Flour Brews | 5-45 | 0-200 | 20-200 | 0-800 |
| No Time | 5-45 | 0-200 | 20-200 | 0-800 |
| Continuous Mix | 30-45 | 0 | 20-200 | 0-800 |
| Frozen Doughs | 30-45 | 0-200 | 20-200 | 0-800 |

*Unencapsulated or encapsulated ADA
**If $H_2O_2$ is substituted for BPO it will be employed in the range of from 20 to about 250 ppm in all exemplified baking methods.

It has also been noted that when a peroxy compound is present, the oxidant level may be reduced somewhat to obtain a desired result in bread improvement.

The following specific examples further illustrate the best mode contemplated by the inventor for the practice of his invention.

EXAMPLE 1

Baking Comparison Showing the Difference in Effect of the Oxidant ADA and its Reduced Product A standard bread dough is made up from the following ingredients:

|  | % |
|---|---|
| Flour | 100 |
| Salt | 2 |
| Dextrose | 4 |
| Yeast | 3 |
| Yeast Food (Bromate-Free) | 0.5 |
| Shortening | 2.5 |
| Calcium Propionate | 0.2 |
| Emulsifier | 0.1-0.5 |
| Water | (amount needed for optimum absorption) |

The ingredients are combined and mixed into a dough, such as for example, a dough for No Time baking method. The dough is mixed at ambient temperature. Doughs are allowed to rest for 10-15 minutes, molded and placed into pans. The doughs are allowed to proof to constant height (1 inch above pan), then baked at 215° C.-216° C. for 20 minutes. The specific volume of the loaf obtained is then determined. Example 1 compares the bread improving action of ADA to its reduced form, biurea.

| Oxidant | Concentration (ppm) | Specific Loaf Volume (cc/g) |
|---|---|---|
| None (control) | — | 5.1 |
| ADA | 45 | 6.1 |
| Reduced ADA* (Biurea) | 45 | 5.2 |

*ADA was degraded (reduced) to biurea using alkaline conditions (ADA = 45 ppm in 1N NaOH for 10 min. then neutralized with 1N HCl). Biurea is also obtained when unencapsulated ADA and AA react with one another.

EXAMPLE 2

Effect of Peroxy Compounds on Specific Loaf Volume Compared with other Free Radical Sources Following a procedure analogous to Example 1 except that doughs were mixed at 68°-70° F., 4% less water was used and were baked the same day (cold doughs). All doughs contained ADA at a concentration level of 44 ppm and fungal alpha amylase at 800 SKB/lb. of flour. After baking the Specific Volume of the loaves was determined:

| Source of Free Radicals | Concentration (ppm) | Sp. Loaf Volume (cc/g) |
|---|---|---|
| Benzoyl peroxide | 200 | 6.5 |
| $Na_2O_2$ | 100 | 5.8 |
| *$H_2O_2$ (5% wt./wt. in water) | 250 (based on $H_2O_2$) | 6.1 |
| K fumarate | 100 | 5.8 |
| K sorbate | 50 | 5.5 |
| control | — | 5.6 |

*pipetted into the flour before dough mixing.

EXAMPLE 3

Illustration of the Improved Loaf Volume provided by addition of a peroxy compound and the leveling of activity effect provided between Different yeasts.

Following a procedure analogous to that of Example 2, doughs are prepared employing either compressed yeast (Red Star) ("A") or active dry yeast (Fermipan) ("B") in the concentrations indicated, incorporating AA, ADA, and benzoyl peroxide (BPO) in the concentrations indicated with the inclusion in all doughs of fungal alpha amylase at a concentration of 800 SKB/lb. of flour. After baking, results on specific loaf volume are as follows:

| Oxidant (conc. ppm) | BPO (ppm) | Yeast (conc % by wt.) | Specific Loaf Vol. (cc/g) |
|---|---|---|---|
| ADA - 45 | 0 | A(5%) | 6.7 |
| ADA - 45 | 200 | A(5%) | 7.0 |
| AA - 200 | 0 | A(5%) | 6.3 |
| AA - 200 | 200 | A(5%) | 7.1 |
| ADA - 45 | 0 | B(2%) | 5.7 |
| ADA - 45 | 200 | B(2%) | 6.9 |
| AA - 200 | 0 | B(2%) | 5.4 |
| AA - 200 | 200 | B(2%) | 6.7 |

The subject matter which applicant regards as his invention is particularly pointed out and distinctly claimed as follows:

1. An improvement in yeast leavened, flour based dough providing bromate free dough having baking properties substantially equivalent to that provided by the use in conventional yeast leavened flour based dough of bromate improver compositions comprising the substitution for a conventional bromate improver composition, in an otherwise conventional yeast leavened, flour based dough, of a peroxy-oxidant improver composition consisting of a peroxy compound selected from the group consisting of benzoyl peroxide, hydrogen peroxide and mixtures thereof; and an oxidant selected from the group consisting of azodicarbonamide and mixtures of azodicarbonamide and ascorbic acid, wherein said azodicarbonamide may be unencapsulated or encapsulated with an encapsulant selected from the group consisting of wheat proteins, wheat flour, corn gluten, hydrocolloid gums, fats and fat derived materials having a melting point from about 40° to about 68° C. and mixtures thereof, and wherein said peroxy-oxidant improver composition is present at a concentration providing at least 20 ppm peroxy compound based on flour weight to said dough.

2. An improvement in yeast leavened, flour based dough as defined in claim 1 wherein the peroxy compound is benzoyl peroxide.

3. An improvement in yeast leavened, flour based dough as defined in claim 1 wherein the oxidant is azodicarbonamide encapsulated or unencapsulated.

4. An improvement in yeast leavened, flour based dough as defined in claim 2 wherein the oxidant is azodicarbonamide encapsulated or unencapsulated.

5. An improvement in yeast leavened, flour based dough as defined in claim 1 wherein the oxidant is a mixture of azodicarbonamide encapsulated or unencapsulated and ascorbic acid.

6. An improvement in yeast leavened, flour based dough as defined in claim 2 wherein the oxidant is a mixture of azodicarbonamide encapsulated or unencapsulated and scorbic acid.

7. A improvement in yeast leavened, flour based dough providing bromate free dough having baking properties substantially equivalent to that provided by the use in said dough of bromate improver compositions, comprising the substitution for a conventional bromate improver, in an otherwise conventional yeast leavened, flour based dough, of a peroxy-oxidant improver composition consisting of peroxy/compound selected from the group consisting of benzoyl peroxide, hydrogen peroxide admixtures thereof; and an oxidant selected from the group consisting of azodicarbonamide and mixture of azodicarbonamide and ascorbic acid, wherein said azodicarbonamide may be unencapsulated or encapsulated with an encapsulant selected from the group consisting of wheat proteins, wheat flour, corn gluten, hydrocolloid gums, fats and fat derived materials having a melting point from about 40° to about 68° C. and mixtures thereof and wherein said peroxy-oxidant improver composition is present at a concentration providing at least 20 ppm peroxy compound based on flour weight to said dough and a mixture of fungal enzymes.

8. An improvement in yeast leavened, flour based dough as defined in claim 7 wherein the fungal enzymes comprise fungal alpha amylase.

9. An improvement in yeast leavened, flour based dough as defined in claim 8 wherein the peroxy compound is benzoyl peroxide.

10. An improvement in yeast leavened, flour based dough as defined in claim 9 wherein the oxidant is encapsulated azodicarbonamide.

11. An improvement in yeast leavened, flour based dough as defined in claim 9 wherein the oxidant is a mixture of encapsulated azodicarbonamide and ascorbic acid.

12. A process for preparing a bromate free, yeast leavened, flour based dough having baking properties substantially similar to an otherwise comparable conventional yeast leavened, flour based dough improved with a bromate improver which comprises adding a peroxy-oxidant improver composition consisting of a peroxy compound selected from the group consisting of benzoyl peroxide, hydrogen peroxide and mixtures thereof; and an oxidant selected from the group consisting of azodicarbonamide and mixtures of azodicarbonamide and ascorbic acid, wherein said azodicarbonamide may be unencapsulated or encapsulated with an encapsulant selected from the group consisting of wheat proteins, wheat flour, corn gluten, hydrocolloid gums, fats and fat derived materials having a melting point from about 40° to about 68° C. and mixtures thereof, and wherein said peroxy-oxidant improver composition is present at a concentration providing at least 20 ppm peroxy compound based on flour weight to an unimproved otherwise conventional yeast leavened flour based dough.

13. A process as defined in claim 12 wherein food grade fungal enzymes are added to the dough in addition to the peroxy-oxidant improver composition.

* * * * *